Oct. 9, 1934.   G. H. SELF   1,976,146
LUGGAGE CARRIER
Filed May 3, 1933
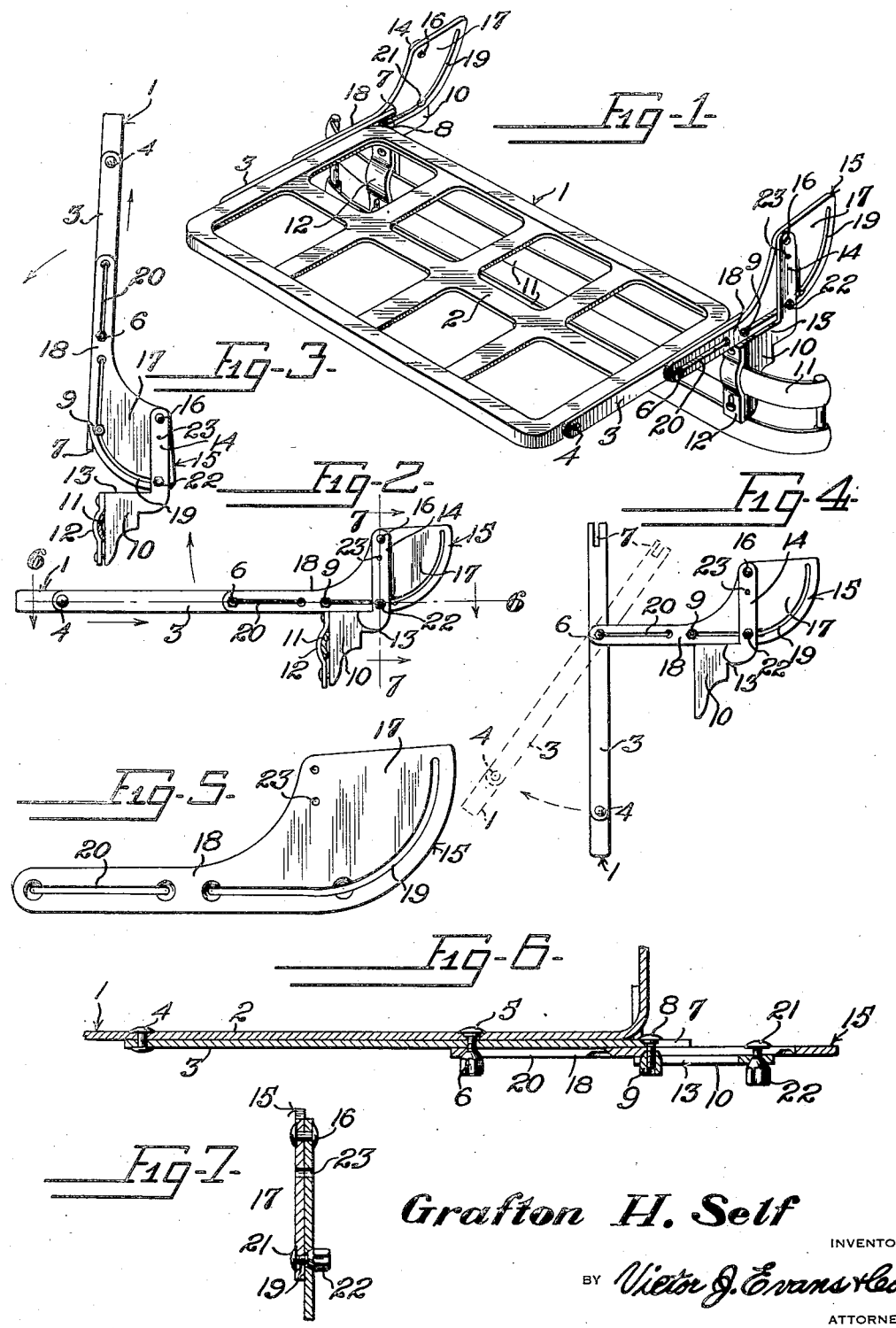
Grafton H. Self
INVENTOR
BY *Victor J. Evans & Co.*
ATTORNEY Patented Oct. 9, 1934

1,976,146

UNITED STATES PATENT OFFICE 1,976,146

LUGGAGE CARRIER

Grafton H. Self, Twin Falls, Idaho

Application May 3, 1933, Serial No. 669,250

2 Claims. (Cl. 224—29)

This invention relates to luggage carriers for automobiles and like vehicles and has for the primary object, the provision of a device of the above stated character which may be readily applied to the bumper of an automobile and is adjustable to occupy either operative or inoperative positions and is easily movable from its positions without interference from the usual spare tire of the automobile and when in its operative position will permit the supporting of luggage in close proximity to the body of the automobile and the spare tire thereof and may be adjusted to a position to permit easy and quick removal of the spare tire from its support.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a luggage carrier attached to a bumper and constructed in accordance with my invention.

Figure 2 is a side elevation partly in section illustrating the carrier in an operative position.

Figure 3 is a similar view showing the carrier in an inoperative position.

Figure 4 is a similar view showing the carrier positioned to permit the removal of the usual spare tire from the automobile.

Figure 5 is an enlarged side elevation of one of the supporting plates.

Figure 6 is a sectional view taken on the line 6—6 of Figure 2.

Figure 7 is a sectional view taken on the line 7—7 of Figure 2.

Referring in detail to the drawing, the numeral 1 indicates a luggage carrier which may be easily and quickly applied to the rear bumper of an automobile for the purpose of supporting the luggage in close proximity to the body of the automobile or the spare tire usually mounted at the rear end of the automobile and consists of a skeleton frame 2 which when positioned horizontally will provide an efficient bed or rest for the luggage and as shown in Figure 3 may be swung to occupy a substantially vertical position, arranging the frame 2 in close proximity to the spare tire or the frame may be positioned as shown in Figure 4 so that the spare tire may be conveniently removed from its support. In this last-named position the frame is positioned downwardly and outwardly of the bumper.

Strips or supporting arms 3 are secured to the sides of the frame 2 by bolts 4, the heads of which are countersunk in the arms and are also connected to the frame by bolts 5 having nuts 6 corresponding to the nuts employed for securing the tire rims of the automobile to their respective wheels. The arms 3 extend rearwardly of the rear edge of the frame 2 and are bifurcated, as shown at 7, to receive bolts 8 having nuts 9 similar to the nuts 6. Brackets 10 are secured to the bumper 11 of the automobile by removable clamps 12 and each include a horizontal portion 13 and a vertical portion 14. Plates 15 are pivoted to the vertical portions 14 of the brackets, as shown at 16, and said plates include enlarged portions 17 and extensions 18. The enlarged portions 17 are provided with substantially arcuate shaped slots 19 which extend into the extensions 18 and have the bolts 8 extending therethrough. The extensions 18 are provided with slots 20 to receive the bolts 5. The slots 19 and 20 at their ends are provided with recesses or countersinks to receive the nuts of the bolts when the latter pass through said slots at their ends. The enlarged portions 17 of the plates 15 carry bolts 21 that extend through the slots 19 and receive nuts 22 similar to the nuts 6 and 9. The bolts 21 are for the purpose of preventing movement of the plates with respect to the brackets and which permit said plates to be swung on their pivots for positioning the frame either in operative or inoperative positions, as shown in Figures 2 and 3. The threading on or removal of the nuts from their respective bolts may be accomplished by the usual rim lug wrench of an automobile.

When it is desired to position the frame 2 as shown in Figure 4 for the purpose of permitting convenient removal of the spare tire of the automobile, the nuts 6 are released and the bolts 8 removed from the bifurcated ends of the arms 3, permitting the arms to pivot on the bolts 5, thereby allowing the frame 2 to depend downwardly outwardly of the bumper. The bolts 5 and 8 working in the slots 20 and 19 and bifurcated ends 7 of the arms 3 permit a limited adjustment of the frame 2 inwardly or outwardly with respect to the automobile.

If desired, additional fasteners may be employed between the vertical portions of the brackets 10 and the plates 15 should it be deemed necessary to prevent pivotal movement of the plates on the brackets, openings 23 being provided for this purpose.

From the foregoing description taken in connection with the accompanying drawing it will be seen that a very efficient and practical luggage carrier has been provided which may be conveniently installed on the rear bumper of an automobile by anyone unskilled in the art and in possession of an ordinary wrench or lug wrench of an automobile and that the carrier also may be easily adjusted to support luggage or folded in a position to occupy a minimum space on the automobile or may be adjusted to assume a position out of the way of the spare tire so that the latter may be applied or removed from the automobile. Further, it is to be noted that the carrier may be adjusted into its various positions without being obstructed by any of the parts of the automobile or the spare tire or wheel thereof.

While I have shown and described the preferred embodiment of my invention, it will be understood that minor changes in construction, combination and arrangement of parts may be made without departing from the spirit and scope of my invention, as claimed.

Having described the invention, I claim:

1. A luggage carrier comprising brackets, plates pivoted to said brackets and having curved slots, extensions on said plates and having slots, a luggage frame arranged between the extensions, arms pivotally secured to the frame and having bifurcated ends, bolts carried by the frame and extending through the arms and slots of the extensions, bolts extending through the bifurcated ends of the arms and the curved slots, and bolts extending through the brackets and the curved slots.

2. A luggage carrier comprising supporting brackets secured to a motor vehicle, plates pivoted to said brackets, arms adjustably secured to said plates, a luggage frame pivoted to said arms, a locking means between the plates and the brackets and locking means between said luggage frame and the arms to maintain said luggage frame parallel with the arms or to free said luggage frame for pivotal movement with respect to the arms.

GRAFTON H. SELF.